3,228,919
PROCESS FOR THE SUSPENSION OF VINYL MONOMERS TO PRODUCE POROUS AND UNIFORM GRANULAR POLYMERS
Giorgio Gatta and Gianni Benetta, Milan, Italy, assignors, by mesne assignments, to Edison, Milan, Italy, a corporation of Italy
No Drawing. Filed Dec. 27, 1961, Ser. No. 162,571
Claims priority, application Italy, Dec. 30, 1960, Patent 643,255
5 Claims. (Cl. 260—85.5)

The present invention relates to a process for the preparation of vinyl polymers and copolymers. By using the process it is possible to obtain a uniform granular product.

In the production of polyvinyl chloride in suspension according to the usual methods, there is an almost general tendency to produce polymers of small particle size (i.e., with most of their particles having diameters within the range from 0.07 to 0.150 mm.) because this seems to give better physical and working properties; however this makes the transformation of the resin for the preparation of the mix more difficult. In fact neither the resin nor the dry blends are very flowable and there are considerable powder losses. Furthemore, the obtaining of small-particle-size PVC is regularly accompanied by a rather wide particle-size distribution (generally within the range from 0.05 to 0.25 mm. diameter) and this leads to a non-homogeneous adsorption of the plasticizers. This phenomenon, as is well known, is one of the main causes of the formation of hard vitreous clots—the well known fish-eyes—in the finished product.

It is an object of the present invention to minimise the above-mentioned disadvantages.

According to the present invention there is provided a process for the preparation of vinyl polymers or copolymers, which comprises dispersing, in an aqueous medium, a polymerizable vinyl monomer or a mixture of such monomers in the presence of two components having a suspended action, namely a first component comprising a copolymer of vinyl acetate and allyl alcohol and a second component comprising a condensate of an polyalkylene glycol and an alkyl phenol. Generally, the second component comprises a condensate of polyethylene glycol and an alkyl phenol. Advantageously the vinyl monomer has the general formula $CH_2=CX_1X_2$, wherein $X_1=H$ or Cl, and $X_2=Cl$, CN or an acyl group.

Thus, for instance, it is possible with a process embodying this invention to obtain polyvinyl chloride which differs considerably from the types of polyvinyl chloride commonly produced for industrial purposes, in that it has a reduced distribution of polymer particles which are of relatively large mean size, has an average particle diameter of about 0.3 mm. and a substantially complete absence of particles with a diameter of less than 0.150 mm. In spite of its relatively large particle size, the polyvinyl chloride obtained according to this embodiment is at least as easily or even more easily worked with conventional machines than small particle-size polyvinyl chloride.

Another notable advantage generally displayed by the polyvinyl chloride obtained according to this technique is that the surface of the polymer is of high porosity and the porosity is evenly distributed over the whole surface of the granules and over each granule. This fact, which is of remarkable importance, is translated in industrial practice into both a high speed of adsorption of the plasticizers and a capacity to absorb large quantities of polymeric and other plasticizers in a reasonably short time. Due to the fact that the polymer is composed of uniform and porous particles the number of hard, vitreous clots (fish-eyes) appearing in the finished product and caused by non-plasticized particles of polymer, is very much reduced.

Some further advantageous characterisctics observed in the polyvinyl chloride obtainable according to the present method are the generally high apparent density of the powder produced, the exceptional flowability of both the resin and mixtures of resin with plasticizer, and the substantially total absence of powder loss during the processing operations. In industrial practice all these desired properties of polyvinyl chloride are translated into a shorter overall duration of the process and a generally better quality of the finished product.

The polyvinyl chloride obtainable in accordance with this embodiment is especially suitable for direct extrusion from dry blends.

Generally speaking, the aqueous medium may include conventional additives to improve or modify the polymerization. For example, it has been found advantageous to add a relatively very small quantity of a copolymer of maleic acid or maleic anhydride and vinyl acetate (cf. U.S. Patent specification 2,562,852).

The copolymer of the first component may be prepared in accordance with the disclosure contained in our copending application, Ser. No. 836,346, filed August 27, 1959, now U.S. Patent No. 3,049,520. The copolymer may be obtained by copolymerizing 3 to 30 parts by weight of allyl alcohol with 97 to 70 parts by weight of vinyl acetate, for instance the quantity of allyl alcohol entering into the copolymer may lie within the range 3% to 15% by weight.

The second component may be an alkyl aryl polyethyleneglycol, wherein the alkyl group of the aryl alkyl radical condensed on the polyoxyethylene chain may be any of the catenary alkyl and cycloalkyl radicals.

The second component may comprise a condensate having 2 to 50 ethoxy ($-CH_2-CH_2-O$) groups and an alkyl or cycloalkyl group, for instance the number of ethoxy ($-CH_2-CH_2-O$) groups may lie within the range 2 to 16, the latter range giving especially good results.

Preferably the amount of the first component is within the range 0.05% to 2% by weight of the vinyl monomer content. Similarly, the preferred amount of the second component is within the range 0.005% to 1% by weight of the vinyl monomer content.

The preferred ratio between the quantities by weight of the first component and the second component to be used in the polymerization in aqueous suspension of vinyl chloride monomer so as to obtain polyvinyl chloride of relatively large size is generally within the range from 10 to 0.1. Practical experience has shown that the most useful quantities of the second component may vary between 0.1% by weight and 0.45% by weight of the monomer, whilst the most convenient quantities of the first component may vary within the range from 0.15% by weight to 0.3% by weight referred to the monomer.

The ratio range by weight between the second component and the first component which has been found most suitable in practice, is 1:2 to 3:1.

The process of this invention involves inter alia variables such as: the rate of agitation, the weight ratio between the quantity of vinyl monomer to be polymerised or copolymerised and the quantity of $H_2O$, the molecular oxygen concentration in the reaction environment, and finally the ratio between the volume of the dispersing medium and the total reaction mass.

The reaction temperatures are not of vital importance as regards the characteristics of the vinyl polymer or copolymer thereof to which the present invention relates. The said temperatures must, however, be so chosen as to ensure adequate reaction speed and the desired molecular weight. For this purpose, in order to obtain a reasonably rapid reaction, activators of the type that are insoluble in water should be used; of these the most used are the usual organic peroxides such as lauryl peroxide, lauroyl peroxide, acetyl peroxide, propionyl peroxide, toluyl peroxide, cyclohexyl sulphonyl acetyl peroxide and others. Conventional catalysts of the azo type such as 2-azo-diisobutyronitrile and diazo-aminobenzene, can be used with advantage.

Mixtures of two or more of such catalysts can also be used. As stated hereinbefore, it may be useful to add to the two components used in the process of this invention, small quantities of a third component having a suspending action and chosen from amongst the copolymers of maleic acid and maleic anhydride with vinyl acetate. The addition to the polymerization formulation of quantities of 0.03% by weight to 0.10% by weight of vinyl acetate/maleic acid or anhydride improves the stability of the aqueous suspension in the sense that it tends to prevent the formation of small quantities of agglomerates with a diameter above 0.5 mm.

In a preferred form of this invention at least 80% by weight of the vinyl-monomer content comprises vinyl chloride.

Preferred embodiments of this invention will now be described by way of example only. In the following examples: VA-AA denotes a copolymer of vinyl acetate and allyl alcohol; PEG-AP denotes the condensate of polyethylene glycol and an alkyl phenol, in the form of nonyl phenyl ether of polyethylene glycol having a molecular weight of 740; it has however been found that almost the same results are obtained with other alkyl-phenyl ethers of polyethylene glycols, the preferred forms being those in which the alkyl radical has from 3 to 12 carbon atoms. VA-MA denotes vinyl acetate/maleic acid or anhydride copolymer.

Examples 3 and 4 do not illustrate this invention but are presented for comparison.

Example 1

Into an autoclave of 500-litres capacity, made of internally vitrified steel and fitted with a stirrer and a temperature-regulation system, there are introduced, in the order given, the following quantities of products:

| Component: | Quantity by weight, parts |
|---|---|
| $H_2O$ | 150.00 |
| VA-AA | 0.20 |
| PEG-AP | 0.45 |
| PEG-AP/VA-AA ratio | 2.25 |
| Lauroyl peroxide | 0.23 |

After closing the autoclave, the quantity of oxygen therein is regulated and then 100 parts by weight of vinyl chloride monomer are rapidly added. The temperature of the reaction bath is set at 52° C. and the speed of stirring at 140 r.p.m. Polymerization is conducted for about twelve hour, after which the residual monomer is degassed and the suspension of polyvinyl chloride is discharged and then centrifuged, washed and dried. The yield of polymer is of the order of 96–97%.

The polymer obtained is found to be granular with homogeneous particle size with granules of size varying from 0.6 mm. to 0.2 mm., highly porous and with a non-vitreous surface. Fine particles are absent.

These characteristics result in the resin polymer being capable of absorbing a plasticiser rapidly and homogeneously, giving dry and extremely flowable dry blends, even with high plasticising rates, which can be directly utilized for extrusion.

The plasticized films of the polymer obtained after processing in a sheeting mill display an absolutely negligible quantity of fish-eyes.

Table 1 shows some analyses of the resin polymer thus obtained.

This table also shows the analyses of the resin polymers referred to in the following Examples 2–12.

TABLE 1

| Examples | 1 | 2 | 3 | 4 | 5 | 6 | 7 | 8 | 9 | 10 | 11 | 12 |
|---|---|---|---|---|---|---|---|---|---|---|---|---|
| (A) Particle sizes, percent of particles held on a screen with mesh aperture of: | | | | | | | | | | | | |
| 0.590 mm | 1 | 0 | 0 | ᵃ 9 | 0 | ᵃ 3 | ᵃ 5 | 0 | 0 | 1 | 2 | 0 |
| 0.420 mm | 11 | 18 | 0 | 1 | 3 | 1 | 24 | 11 | 4 | 4 | 2 | 6 |
| 0.250 mm | 72 | 75 | 0 | 50 | 87 | 55 | 23 | 72 | 63 | 81 | 83 | 65 |
| 0.177 mm | 16 | 17 | 5 | 29 | 9 | 37 | 30 | 5 | 29 | 14 | 14 | 25 |
| 0.149 mm | 0 | 0 | 2 | 3 | 0 | 1 | 4 | 12 | 3 | 0 | 0 | 4 |
| 0.105 mm | 0 | 0 | 13 | 5 | 0 | 2 | 9 | 0 | 0 | 0 | 0 | 0 |
| 0.074 mm | 0 | 0 | 43 | 2 | 0 | 1 | 3 | 0 | 0 | 0 | 0 | 0 |
| Over 0.074 mm | 0 | 0 | 37 | 1 | 0 | 0 | 1 | 0 | 0 | 0 | 0 | 0 |
| (B) Plasticizer adsorption speed (1) (minutes and seconds) | 3′ | 3′15″ | 6′ | 3′ | 3′15″ | 5′30″ | 5′30″ | 3′ | 3′ | 2′45″ | 2′30″ | |
| (C) Number of fish-eyes (2) | 15 | 18 | 20 | 30 | 12 | 25 | 22 | 9 | 20 | 6 | 12 | 4 |
| (D) Flowability, g./sec. (3): | | | | | | | | | | | | |
| (I) Resin | 17 | 16.30 | 15 | | 17.2 | | | 15 | | 17.20 | | |
| (II) Dry blends: | | | | | | | | | | | | |
| 100 resin/20 dioctyl+phthalate | 15 | 14.45 | 6 | | 15 | | | 12 | | 15.50 | | |
| 100 resin/50 dioctyl+phthalate | 12 | 11.25 | (ᵇ) | | 11.30 | | | 10 | | 12.54 | | |
| 100 resin/70 dioctyl+phthalate | 11.30 | 11 | (ᵇ) | | 11.30 | | | 9 | | 12.0 | | |
| 100 resin/100 dioctyl+phthalate | 8 | 7.50 | (ᵇ) | | 8.2 | | | 7.30 | | 9.0 | | |
| 100 resin/120 dioctyl+phthalate | 5 | 5 | (ᵇ) | | 5.2 | | | 5.30 | | 6.0 | | |
| (E) Apparent (bulk) density, g./cc | 580 | | 0.50 | | | | | | | | | |

ᵃ For the largest crusts and coagula.
ᵇ Not flowable.

NOTES (1), (2), (3).—Test methods (v. infra).

TEST METHODS (1) The speed of absorption of the plasticizer is measured by mixing, with a suitable stirrer, 100 parts by weight of polyvinyl chloride with 50 parts by weight of dioctyl-phthalate (DOP) at the thermostatically controlled temperature of 100° C., and drawing every 15 seconds a sample of the mixture, which is smeared by a spatula against a sheet of filter paper. It is observed whether the sample stains the paper. When the plasticizer has been completely absorbed there will no longer be any stain.

This time, expressed in minutes and seconds, is given as the index of absorption speed of the plasticizer.

(2) The number of fish-eyes is measured by counting the non-homogenized vitreous particles with a diameter greater than two-tenths of a millimetre on a square 20 x 20 cm. cut from a thin film obtained in the sheeting mill by processing at a temperature of 150° C. a mixture of 80 g. of polyvinyl chloride, 40 g. of dioctylphthalate, 0.8 g. of cadmium stearate and 2.4 g. of a dyeing mixture containing polyvinyl chloride, DOP, cadmium stearate and carbon black.

(3) The flowability is measured by weighing the quantity of resin or dry blend that flows freely per unit of time through a stainless steel funnel with a ½″ diameter bore and walls with a 60° slope.

*Example 2*

Example 1 is repeated with the variant of incorporating 0.075 part of VA-MA.

The polymer obtained is free from particles larger than 0.590 mm. (small coagula, crusts, large particles).

*Example 3*

Example 2 is repeated with the variant of omitting the introduction of the PEG-AP into the autoclave.

The absence of one component of the pair of suspending agents, viz. the second component, produces a fine polymer with a wide spread of particle size. There is a worsening in the speed of absorption of the plasticizer and in the flowability.

The number of fish-eyes remains low.

*Example 4*

Example 2 is repeated with the variant that the introduction of the AA-VA (viz. the first component) is omitted. The lack of this component of the pair of suspending agents leads to a polymer with a fairly wide spread of particle size together with the formation of considerable quantities of coagula.

*Examples 5, 6 and 7*

Example 2 is repeated but varying the angular velocity of the stirrer to 140 radians per minute (Example 5), 150 radians per minute (Example 6) and 170 radians per minute (Example 7). As the stirring rate increases there is a widening of the particle size distribution with the formation of crusts and coagula.

*Examples 8 and 9*

The procedure is as in Example 1 but the quantity of PEG-AP is altered to 0.05 part by weight (Example 8) and 0.15 part by weight (Example 9) so that PEG-AP/VA-AA ratio becomes respectively 0.25 and 0.75. With lower quantities of PEG-AP there is a slight increase in the range of the particle size distribution.

*Examples 10 and 11*

The procedure of Example 1 is followed but the quantity of VA-AA is varied. In Example 10, 0.15 part of VA-AA is introduced so that the PEG-AP/VA-AA ratio becomes equal to 3, and in Example 11 the quantity of VA-AA is 0.4 so that the PEG-AP/VA-AA ratio becomes equal to 1.12.

No appreciable variations in the quality of the polyvinyl chloride obtained are observed.

*Example 12*

The procedure of Example 1 is followed with the modification that, instead of 100 parts by weight of vinyl chloride monomer, 96 parts by weight of vinyl chloride monomer and 4 parts by weight of vinyl acetate monomer are used. A granular resin with large, uniform particles is obtained.

We claim:

1. In a process for the suspension polymerization of at least one polymerizable vinyl monomer having substantially the formula

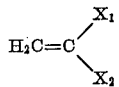

wherein $X_1$ is selected from the group which consists of H or Cl and $X_2$ is selected from the group which consists of Cl, CN and acetate, the improvement which comprises the step of polymerizing the monomer in an aqueous suspension thereof in the presence of a polymerization initiator selected from the group which consists of organic-peroxide and azo suspension-polymerization initiators, and at least two suspending components, including a first component consisting essentially of a copolymer of vinyl acetate and allyl alcohol and a second component consisting essentially of a condensate of a polyethylene glycol and an alkyl phenol.

2. In a process for the suspension polymerization of at least one polymerizable vinyl monomer having substantially the formula

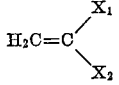

wherein $X_1$ is selected from the group which consists of H or Cl and $X_2$ is selected from the group which consists of Cl, CN and acetate, the improvement which comprises the step of polymerizing the monomer in an aqueous suspension thereof in the presence of a polymerization initiator selected from the group which consists of organic-peroxide and azo suspension polymerization initiators, and at least two suspending components, including a first component consisting essentially of a polymer of vinyl acetate and allyl alcohol and a second component consisting essentially of a condensate of a polyethylene glycol and an alkyl phenol, said first component being present in an amount ranging between substantially 0.05% and 2% by weight of said monomer and said second component being present in an amount ranging between substantially 0.005% and 1% by weight of said monomer.

3. In a process for the suspension polymerization of at least one polymerizable vinyl monomer, having substantially the formula

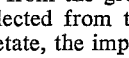

wherein $X_1$ is selected from the group which consists of H or Cl and $X_2$ is selected from the group which consists of Cl, CN and acetate, the improvement which comprises the step of polymerizing the monomer in an aqueous suspension thereof in the presence of a polymerization initiator selected from the group which consists of organic-peroxide and azo suspension-polymerization initiators, and at least two suspending components, including a first component consisting essentially of a copolymer of vinyl acetate and allyl alcohol and a second component consisting essentially of a condensate of a polyethylene glycol having between substantially 2 and 50 ethoxy groups and an alkyl phenol having between substantially 3 and 12 carbon atoms, said first component being present in an amount ranging between substantially 0.05% and 2% by weight of said monomer and said second component being present in an amount ranging between substantially 0.005% and 1% by weight of said monomer, said first component being produced by copolymerizing 3 to 30 parts by weight allyl alcohol with 97 to 70 parts by weight vinyl acetate per 100 parts by weight of said first component.

4. A process for the preparation of vinyl copolymers, which comprises dispersing in an aqueous medium a mixture of copolymerizable vinyl monomers having the general formula $CH_2=CX_1X_2$, wherein $X_1$ is H or Cl and $X_2$ is Cl, CN or an acyl group, in the presence of a first component comprising a copolymer of vinyl acetate and allyl alcohol, a second component comprising a condensate of polyalkylene glycol and an alkyl phenol, and a polymerization initiator of the peroxide type.

5. A process for the preparation of vinyl copolymers, which comprises dispersing in an aqueous medium a mixture of coplymerizable vinyl monomers having the general formula $CH_2=CX_1X_2$ wherein $X_1$ is H or Cl and $X_2$ is Cl, CN or acyl group, in the presence of a first component comprising a copolymer of vinyl acetate and allyl alcohol, a second component comprising a condensate of polyalkylene glycol and an alkyl phenol, and a polymerization initiator of the azo type.

References Cited by the Examiner
UNITED STATES PATENTS

| | | | |
|---|---|---|---|
| 3,049,520 | 8/1962 | Gatta et al. | 260—92.8 |
| 3,055,876 | 9/1962 | Grotz | 260—92.8 |

JOSEPH L. SCHOFER, *Primary Examiner.*

JOSEPH R. LIBERMAN, *Examiner.*